United States Patent

Ovshinsky

[15] 3,698,006

[45] Oct. 10, 1972

[54] HIGH SPEED PRINTER OF MULTIPLE COPIES FOR OUTPUT INFORMATION

[72] Inventor: Stanford R. Ovshinsky, Bloomfield Hills, Mich.

[73] Assignee: Energy Conversion Devices, Inc., Troy, Mich.

[22] Filed: May 29, 1969

[21] Appl. No.: 828,859

Related U.S. Application Data

[63] Continuation-in-part of Ser. No. 754,607, Aug. 28, 1968, abandoned, and a continuation-in-part of Ser. No. 791,441, Jan. 15, 1969, Pat. No. 3,531,441.

[52] U.S. Cl. .......46/74 ES, 101/DIG. 13, 178/6.6 A, 346/74 P

[51] Int. Cl. .......G03g 15/00, H01n 1/24, H04n 1/30

[58] Field of Search...........346/74 ES, 74 ESX, 74 P; 178/6.6 A, 6.7, 7.6; 101/DIG. 13

[56] References Cited

UNITED STATES PATENTS

| | | | |
|---|---|---|---|
| 3,155,022 | 11/1964 | Schwertz | 178/6.6 |
| 3,259,733 | 7/1966 | Klaver | 178/7.6 |
| 3,271,591 | 9/1966 | Ovshinsky | 307/258 |
| 3,358,081 | 12/1967 | Young | 178/6.6 |
| 3,461,229 | 8/1969 | Oppenheimer | 178/6.7 |
| 3,484,792 | 12/1969 | Gold | 178/6.6 |
| 3,520,586 | 7/1970 | Bousky | 178/7.6 |
| 3,530,441 | 9/1970 | Ovshinsky | 178/6.6 A |

*Primary Examiner*—Howard W. Britton
*Attorney*—Wallenstein, Spangenberg, Hattis & Strampel and Edward G. Fiorito

[57] ABSTRACT

A method and apparatus for high speed printout of multiple copies wherein a film or layer of memory semiconductor material is scanned by energy beam means to permanently store therein the information to be reproduced. The film is capable of having discrete portions thereof reversibly altered between a high resistance blocking condition and a low resistance conducting condition, the film normally being in one condition. The film of semiconductor material forms an information storage surface on a rotating drum, and energy pulses are synchronized with and applied to selected portions of the semiconductor material on the drum surface for altering the film at said select portions thereof from said one normal condition to the other condition to store the information in the material forming the film. Computer means are provided to convert bits of data input information into energy pulses and to synchronize these pulses wit predeterminable topographic sites on the semiconductor film surface where the pulses impinge and alter the condition of the surface to permanently store the information. The retrieval of the stored information is non-destructive to the stored information and high speed print-out of multiple copies is possible without further need of the computer means.

3 Claims, 6 Drawing Figures

Inventor
Stanford R. Ovshinsky

By: Wallenstein, Spangenberg, Hattis, + Strampel attys

Inventor
Stanford R. Ovshinsky

By: Wallenstein, Spangenberg, Hattis & Strampel attys.

HIGH SPEED PRINTER OF MULTIPLE COPIES FOR OUTPUT INFORMATION

This application is a continuation-in-part of Application Ser. No. 754,607, filed Aug. 28, 1968, and entitled "Method and Apparatus for Producing, Storing and Retrieving Information" (now abandoned), and application Ser. No. 791,441, filed Jan. 15, 1969, entitled "-METHOD AND APPARATUS FOR STORING AND RETRIEVING INFORMATION," now U.S. Pat. No. 3,531,441.

This invention relates generally to storing and retrieving information, and more particularly to means for converting bits of input data information into energy pulses and synchronizing the pulses with topographic sites on the surface of a rotating drum so that printout of multiple copies can be obtained. The invention has particular utility as a high speed printing means of single or multiple copies of computer output information although some aspects of the invention have a more general application.

The principal object of this invention is to provide a new and improved method and apparatus of producing, storing and retrieving information in the form of high speed printout of single or multiple copies from electrically generated signals, such as a computer output.

The present invention makes use of a film of variable resistance memory material which may be applied to the surface of a printing drum, discrete portions of the film capable of being reversibly altered between a stable low resistance condition and a stable high resistance condition by means of a drum scanning beam of pulse energy to permanently store the information to be reproduced. The memory material is most advantageously a film or layer of semiconductor material like that disclosed and claimed in U.S. Pat. No. 3,271,591, granted on Sept. 6, 1966 to Standford R. Ovshinsky. (While for purpose of illustration, reference is made to semiconductor materials of the type disclosed in U.S. Pat. No. 3,271,591, other materials having memory characteristics similar to those disclosed in this patent may be utilized in this invention.) The semiconductor materials disclosed in said U.S. Pat. No. 3,271,591 may be formed as a film or layer on a substrate or base. Discrete portions of such film or layer of semiconductor material can be reversibly altered between a stable low resistance condition to a stable high resistance condition by the feeding of a suitable energy to the discrete portions of the semiconductor material involved.

Assuming the film or layer to be in its stable high resistance condition, desired discrete portions thereof may be altered to a stable low resistance condition by energy applied thereto which can be in the form of energy pulses of sufficient duration (e.g. 1–100 milliseconds or more) to cause the alteration to the low resistance condition to take place and be frozen in. Such desired discrete portions may be realtered to the stable high resistance condition by energy applied thereto which can be in the form of energy pulses of short duration (e.g. 10 microseconds or less) to cause the realteration to the high resistance condition to take place and be frozen in.

Conversely, assuming the film or layer to be in its stable low resistance condition, desired discrete portions thereof may be altered to a stable high resistance condition by energy applied thereto which can be in the form of energy pulses of short duration (e.g. 10 microseconds or less) to cause the alteration to the high resistance condition to take place and be frozen in. Such desired discrete portions may be realtered to the stable low resistance condition by energy applied thereto which can be in the form of energy pulses of sufficient duration (e.g. 1–100 milliseconds or more) to cause the realteration to the low resistance condition to take place and be frozen in.

The reversible alteration of desired discrete portions of the layer or film of the memory semiconductor material between the high resistance or insulating condition and the low resistance or conducting condition can involve configurational and conformational changes in atomic structure of the semiconductor material, which is preferably a polymeric type structure, or charging and discharging the semiconductor material with current carriers, or combinations of the two wherein such changes in atomic structure are frozen in the charged conditions. These structural changes, which can be of a subtle nature, may be readily effected by applications of various forms of energy at the desired discrete portions of the layer or film and they can produce and store information in various modes which may be readily read out or retrieved, It has been found, particularly where changes in atomic structure are involved, that the high resistance and low resistance conditions are substantially permanent and remain until reversibly charged to the other condition by the appropriate application of energy to make such change.

In its stable high resistance or insulating condition, the memory semiconductor material is a substantially disordered and generally amorphous structure having local order and/or localized bonding of the atoms. Changes in the local order and/or localized bonding which constitute changes in atomic structure, i.e., structural changes, which can be of a subtle nature, provide drastic changes in the electrical characteristics of the semiconductor material, as for example, resistance, capacitance, dielectric constant, charge retention, and the like, and the changes in these various characteristics may be readily used in determining the condition of the desired discrete portions with respect to that of the remaining portions of the layer or film of semiconductor material for reading out or retrieving the information stored therein.

The changes in local order and/or localized bonding, provinding the structural change in the semiconductor material, can be from a disordered condition to a more ordered condition, such as, for example, toward a more ordered crystalline like condition. The changes can be substantially within a short range order itself still involving a substantially disordered and generally amorphous condition, or can be from a short range order to a long range order which could provide a crystalline like or pseudo crystalline condition, all of these structural changes involving at least a change in local order and/or localized bonding and being reversible as desired. Desired amounts of such changes can be effected by applications of selected levels of energy.

The aforementioned alterations can be effected in various ways, as by energy in the form of electric fields, radiation or heat, or combinations thereof, the simplest being the use of heat. For example, where energy in the form of voltage and current is used, both electric fields and heat can be involved. Where energy in the form of electromagnetic energy, such as a photoflash lamp light, is used both radiation and heat can be involved. Where energy in the form of particle beam energy, such as electron, proton or laser beams is used, in addition to heat, there can also be involved a charging and flooding of the semiconductor material with current carriers which is made possible by the high density of local states in the forbidden band. Since heat energy is the simplest to use and explain, this invention will be considered below by way of explanation in connection with the use of such heat energy, it being understood that other forms of energy may be used in lieu thereof or in combination therewith within the scope of this invention.

When energy in the form of energy pulses of relatively long duration is applied to desired discrete portions of a film or layer of the memory semiconductor material in its stable high resistance or insulating condition, such portions are heated over a prolonged period and changes in the local order and/or localized bonding occur during this period to alter the desired discrete portions of the semiconductor material to the stable low resistance condition which is frozen in. Such changes in the local order and/or localized bonding to form the stable low resistance condition can provide a more ordered condition, such as, for example, a condition toward a more ordered crystalline like condition, which produces low resistance.

When realtering the desired discrete portions of the memory semiconductor material from the low resistance condition to the high resistance condition by energy in the form of energy pulses of relatively short duration, sufficient energy is provided to heat the desired discrete portions of the semiconductor material sufficiently to realter the local order and/or localized bonding of the semiconductor material back to a less ordered condition, such as back to its substantially disordered and generally amorphous condition of high resistance which is frozen in. These same explanations apply where the normal condition of the memory semiconductor material is the low resistance or conducting condition and where the desired discrete portions thereof are altered to the high resistance or insulating condition.

In the memory semiconductor materials of this invention, it is found that the changes in local order and/or localized bonding as discussed above, in addition to providing changes in electrical resistance, they also provide changes in capacitance and dielectric constant, in refraction, surface reflection, absorption and transmission of electromagnetic energy, such as light or the like, and in particle scattering properties or the like.

The energy applied to the memory semiconductor material for altering and realtering the desired discrete portions thereof may take various forms, as for example, electrical energy in the form of voltage and current, beam energy, such as electromagnetic energy in the form of radiated heat, photoflash lamp light, laser beam energy or the like, particle beam energy, such as electron or proton beam energy, energy from a high voltage spark discharge or the like, or energy from a heated wire or a hot air stream or the like. These various forms of energy may be readily modulated to produce narrow discrete energy pulsations of desired duration and of desired intensity to effect the desired alteration and realteration of the desired discrete portions of the memory semiconductor material, they producing desired amounts of localized heat for desired durations for providing the desired pattern of information in the film or layer of the memory semiconductor material.

The pattern of information so produced in the memory semiconductor film or layer described remains permanently until positively erased, so that it is at all times available for display purposes. The invention is, therefore, particularly advantageous for various memory application. Also, by varying the energy content of the various aforesaid forms of energy used to set and reset desired discrete areas of the memory semiconductor material, the magnitude of the resistance and the other properties referred to can be accordingly varied with some memory materials.

The above mentioned memory material is most advantageously used in accordance with this invention by forming a thin film or layer of this material on a drum surface, it being understood that the surface may take configurations other than on a drum. The application of information on the drum surface may be by control apparatus which receives information output signals from a conventional computer and temporarily stores and converts this information into bits of data information in the form of sequential control signals to operate drum indexing and drum scanning beam energizing apparatus. This control apparatus is in effect a data decoding and translating means which effects the application of energy pulses at predetermined point locations on the surface of the drum to alter discrete points of the variable resistance memory material thereon from one of its resistance conditions to the other of its resistance conditions. The drum most advantageously operates with other apparatus to form a high speed printer of multiple copies and is an information storage means so the computer is not needed to feed signals to the output printing apparatus to make each copy of the multiple copies. That is, the computer is used only for the initial storing operation and thereafter the computer can be used for other purposes.

The drum can be used as a printout device in a number of ways. Most advantageously the drum surface is selectively charged in accordance with the pattern of high and low resistance regions thereon. In such case those portions of the film of memory material on the drum which are in a high resistance insulating condition will retain electrical charge while the other portions of the drum in the low resistance condition will not retain electrical charge. Triboelectric particles or the like may be adhered to the electrically charged portions of the film and then transferred and affixed to a receiving surface such as paper or the like. Since the film on the surface of the drum is made of memory material as described, multiple copies of the stored information can be printed without requiring a new storage operation each revolution of the drum. The stored information on the drum may be erased from the film by applying energy thereto which resets all set portions of the memory material to a reference high or low resistance condition, the low resistance condition being the most preferred reference resistance condition.

After a new printout operation the high resistance portions of the film which are in the set condition may be reset to a low resistance condition by applying relatively long pulses of energy thereto so that the set condition portions will be altered to the reset low resistance condition.

Other features of this invention relate to the means by which the drum is indexed and the scanning thereof is achieved to record information at the proper places thereon.

The above and other objects, advantages and features of this invention will become apparent to those skilled in the art upon reference to the accompanying specification, claims and drawings in which:

Figure 1:
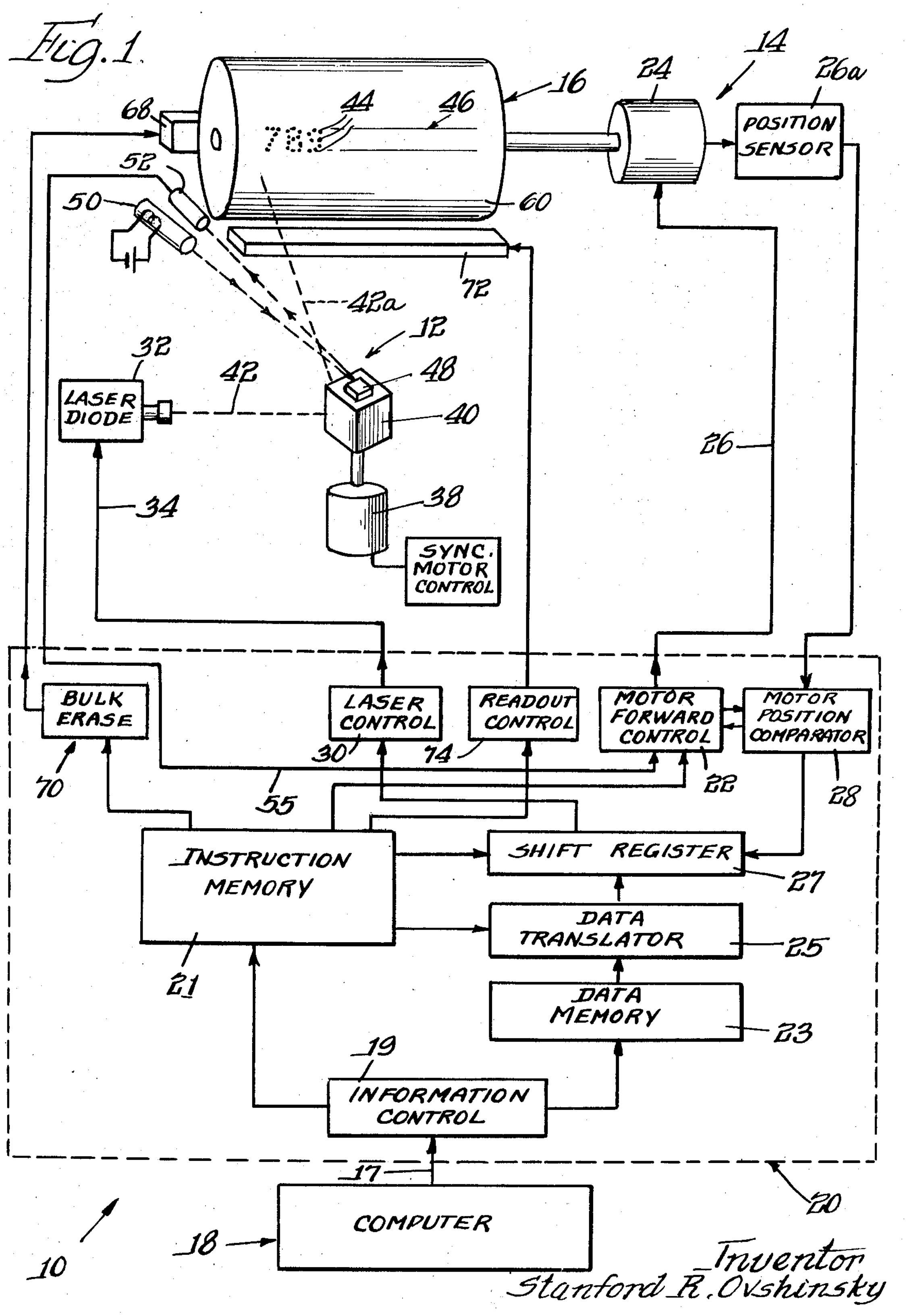
FIG. 1 is a diagrammatic representation of apparatus used to index and scan a drum with beam energy under the influence of a computer to store information on the drum surface.

Referring now to FIG. 1 there is illustrated one form of this invention and includes computerized control apparatus designated generally by reference numeral 10, energy forming and scanning apparatus 12, and indexing apparatus 14. The computerized control 10 generates binary numerical or other informational output signals on output lines 17 some of which is desired to printout in multiple copies by the printer apparatus of the invention. The other major components 12 and 14 operate in combination with one another to effect permanent storage of the information onto the surface of a drum 16 at precise locations thereon. The information is permanently stored on the drum surface and can be retrieved therefrom without further use of the major components of the computerized control apparatus 10, thereby making the computer available for other use at the same time as information is being readout of the drum 16. The computerized control 10 may include a conventional data processing computer 18 or the like which may receive input signal information in the form of a punched tape, magnatic tape, punched cards or the like, the input signal information being processed serially or in the parallel form and delivered to a data decoder and translator unit 20 via lines 17. Here the input signal information is processed by the decoder and translator unit 20 to develop data information and instructional information for the direct operation of the various functions of the components of the apparatus. This is accomplished in the data decoder and translator unit by various circuits per se well known in the art. First data and instruction information are separated by the information control circuit 19 which selectively delivers the different kinds of information to instruction memory and data memory storage units 21 and 23 respectively where the information is stored and removed therefrom in the proper sequence. After all the information is placed in the proper memory unit, the computer 18 is made available for other use since it is no longer needed for storing the information on the drum surface or for reproducing the information. The data information is that information which is to be stored on the drum 16 and reproduced therefrom, the data information being converted by a data translator 25 into groups of pulses preferably corresponding to the dark colored printing is to be made on a light background print receiving surface. These group of pulses form a pattern which correspond to the elemental portions of the characters involved to be recorded on the drum surface in a single scan line. These groups of pulses are stored as markers temporarily in different sections of a shift register 27 and removed therefrom in a synchronized and sequential manner. The output of the shift register 27 is synchronized by control signals from the instruction memory unit 21 which also controls the operation of other components of the apparatus of FIG. 1.

A motor forward control circuit 22 receives a start signal from the instruction memory unit 21 and thereafter controls the operation of a stepping motor 24 via a line 26 to accurately index the angular position of the drum 16. The stepping motor 24 may include a gear reducer so that each step of the motor corresponds to a small fractional part of a revolution of the drum 16 as, for example, one angular minute of a revolution. Each time the stepping motor 24 moves to a new position in response to a signal from the motor forward control circuit 22, a position sensor **26*a* developes a signal in response to such movement; the position sensor being any well known device used for this purpose. An output signal from the motor forward control circuit 22 is also delivered to a motor position comparator circuit 28 which, in turn, receives the output signal from the position sensor 26*a* and compares these signals to determine whether or not the stepping motor 24 has actually moved to the new location. Therefore, if for some reason the motor does not advance one step in response to a pulse applied thereto, the motor position comparator circuit 28, having information that a pulse was applied, will respond to the position sensor 26*a* to cause the motor forward control circuit 22 to repeat the previously ineffectual pulse until the motor advances. If the motor does not advance suitable warning means may be provided to stop the apparatus and indicate to the user the nature of the trouble The comparator circuit 28 is also connected to the shift register 27** to lock the output of the shift register so that additional pulses are not removed therefrom until the drum is properly indexed to the next position.

With the drum 16 in the desired location, a laser beam power control unit 30 receives the series of pulses from the shift register 27 and applies these pulses to a laser diode device 32 via a line 34 to energize the same during each pulse so that pulses of beam energy are developed and directed toward desired locations on the surface of the drum 16. The beam scanning is accomplished by providing means to effect linear scanning axially of the drum surface. In one form of this invention the pulses of beam energy are synchronized by a fixed or variable speed synchonous motor 38 which rotates a four-sided mirror structure 40. As the mirror structure 40 rotates, precise angular positions of one of the moving mirror surfaces receives an energy beam 42 from the laser diode device 32 and directs the beam 42 toward the surface of the drum 16, as indicated by the reflected beam 42*a*, the energy beam being modulated between on and off conditions to alter the resistance condition of the film on the drum at precise points corresponding to the on condition of the energy beam. As the mirror structure 40 rotates and beam energy is reflected from one of the mirror surfaces thereof, a scan line 44 is traced on the drum surface each time a different mirror surface is positioned to receive the energy beam 40 to cause elemental portions of drum surface along the scan line 44 to be altered in resistance condition and to form elemental portions of characters, as for example, portions of the characters "789." The characters "789" are formed on a character line 46 (FIG. 3) which comprises a plurality of closely spaced scan lines 44 that are ultimately combined to form the composite characters. In the preferred form of this embodiment, the variable resistance memory material on the surface of the drum 16 is in the low resistance conducting condition and the beam energy 42*a* alters the material at the discrete portions along the scan lines 44 thereof to the high resistance blocking condition, it being understood that the variable resistance memory material less desirably may be in the high resistance condition with discrete portion thereof altered to the low resistance condition depending on the type and character of the printed reproduction, whether it be a positive or a negative reprint.

As the mirror structure 40 rotates, successive scan lines are formed each time a different mirror surface is positioned to receive the energy beam 42, and by sensing the beginning or end position of each of the scan lines, control signals are developed for indexing the drum 16 to the new position which is very close to the previous position. This may be accomplished by an auxiliary mirror structure 48 mounted on top of the mirror structure 40 for receiving a light signal from a conventional light source 50 and reflecting the light back to a detector 52 which may be a photocell or the like to develop an output signal which is delivered to the motor forward control circuit 22 which, in turn, applies a signal to the stepping motor 24 to advance to drum to the next indexed position. After the drum 16 is positioned to the new location to receive the next scan line 44, the motor position comparator will apply a control signal to the shift register 27 which, in turn, causes the next group of pulses to be generated by the laser control circuit 30 and the laser diode 32 to form the next sequence of dots on the drum surface. This process is repeated for each scan line forming a character line until the composite characters of that character line are formed on the surface of the drum.

Figure 3:
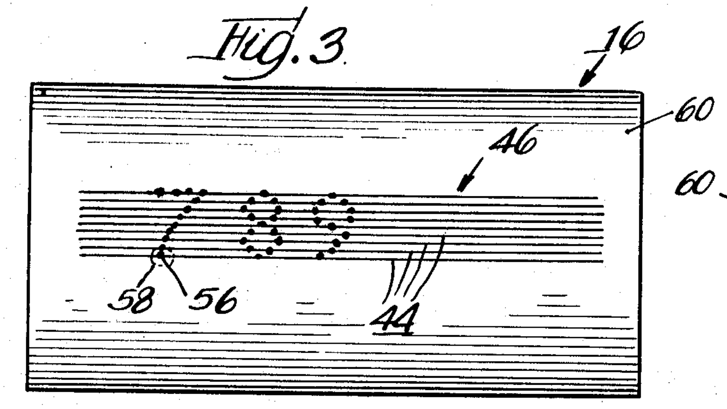
FIG. 3 is a fragmentary portion of the drum of FIG. 1 showing the manner in which indicia is recorded on the surface thereof.
Figure 4:
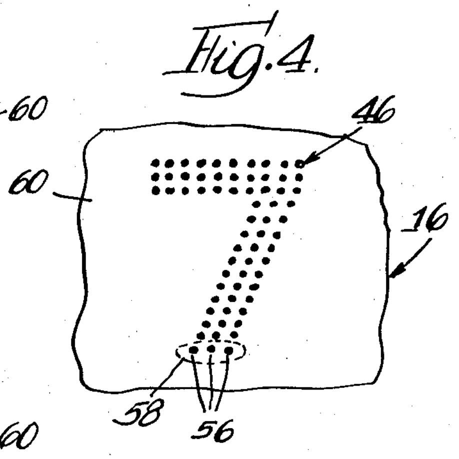
FIG. 4 is an enlarged fragmentary view of a portion of the drum of FIG. 1 showing an alternate method of forming indicia on the drum surface.
Figure 2:
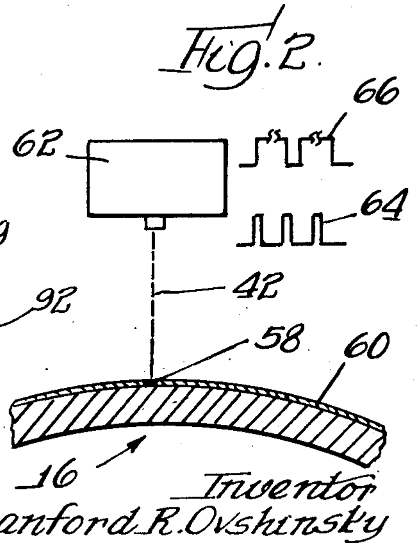
FIG. 2 is a diagrammatic illustration showing a film of variable resistance memory material in a low resistance blocking condition with energy in the form of beam energy for altering desired portions of the film from the low resistance conducting condition to the high resistance blocking condition.

The methods of forming characters along the character line 46 is best illustrated in FIGS. 2, 3, and 4 wherein fragmentary portions of the drum surface are illustrated and the composite characters "789" are shown as a plurality of dots each of which correspond to a discrete point of the memory material in the high resistance blocking condition, it being understood that the dots may or may not be visible to the human eye. The method shown in FIG. 3 forms a coarse outline of the characters produced by turning on the energy beam within the group of pulses forming the scan line to form a single dot 56 within each elemental area 58. On the other hand, FIG. 4 illustrates a method of forming fine character resolutions by turning on the energy beam within the group of pulses forming the scan line in a manner to form a plurality of dots 56 within each of the elemental areas 58.

A partial cross sectional view of the drum 16 is shown in FIG. 2 wherein the layer or film of variable resistance memory material is indicated by reference numeral 60 and the apparatus for directing the energy beam 42 toward the drum surface is shown in a much simplitied form as indicated by reference numeral 62. The memory material 60 is shown in its low resistance conducting condition with the discrete point forming the dot 58 being in the high resistance blocking condition. To accomplish this change of resistance condition, the energy beam 42 is pulsed to form energy beam pulses 64 of relatively short time duration, for example, a nanosecond or so to alter the material to its stable high resistance blocking condition. If it is desirous to realter the dot 58 from the high resistance condition back to its low resistance condition then the beam energy 42 is modulated with wider pulses 66 to effect such change.

A bulk erase device 68, of FIG. 1, is provided to alter all of the portions of the layer 60 that are in the high resistance blocking condition to a low resistance conducting condition, thereby making the surface of the drum 16 ready to receive and store new information. The bulk erase device 68 is connected to an erase control circuit 70 which is a part of the decoder and translator unit 20 and receives control signals from the instruction memory 21, for example, when the desired number of copies of one kind of information has been reproduced and it is necessary to clear this information from the drum surface before new information can be stored. On the other hand, if it is desired to realter only portions of the memory material on the drum surface then the laser beam may be directed to the exact topographic site on the drum and relatively long duration pulses generated to change the memory material from its high resistance set condition to its low resistance reset condition.

Figure 5:
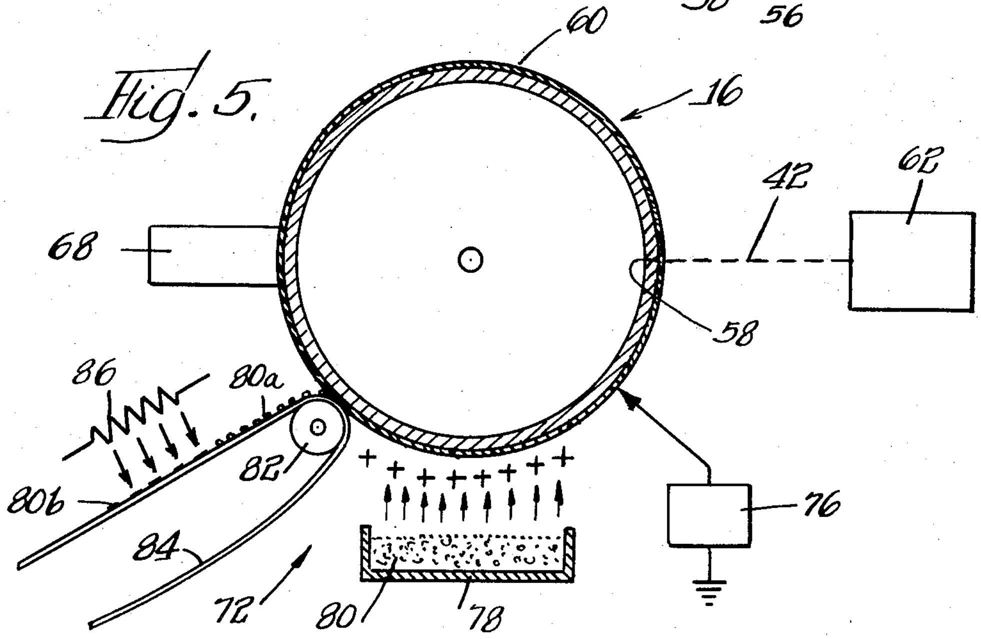
FIG. 5 is a diagrammatic illustration showing apparatus for high speed printout of multiple copies of the information stored on the drum.

The information is retrieved from the drum surface by readout means 72 of FIGS. 1 and 5 which may be controlled by a readout control circuit 74 which forms a part of the decoder and translator unit 20 and is operated by the instruction memory 21, or the readout means 72 may be controlled by separate means, to produce multiple printed copies of the stored information under separate control by an operator.

The readout means 72 may comprise, as shown in FIG. 5, an arrangement wherein the retrieval of the information is accomplished by providing the layer 60 of memory material with imprint producing means, as for example, electric charge, and applying thereto means for printing out, as for example, adhering triboelectric particles to the charged portions of the film and by transferring such triboelectric particles to a receiving surface or carrier and affixing the same thereto. As previously indicated layer 60 is initially in the low resistance conducting condition and energy in the form of the beam 42 from the laser diode 32 alters desired portions of the layer 60 from its low resistance conducting condition to its high resistance blocking condition as indicated at 58. By longitudinally moving and pulsating the beam 42 with respect to the drum 16 along each scan line 44, a desired pattern of information may be produced and stored in the layer 60. The electric changes are applied by an electric charge generator 76 which applies electric charges to those portions 56 of the layer which are in the high resistance blocking condition and not appearing at those portions of the layer which are in the low resistance conducting condition, since in the latter portions the electrical charge is dranined through the low resistance. The charges produced on the layer 60 are indicated by + signs. Disposed adjacent the layer 60 on the drum 16 is a container 78 of triboelectric particles 80 which are attracted from the container 78 onto the charged portions of the layer. The layer with the triboelectric particles adhered thereto pass a roller 82 carrying a receiving surface or carrier 84 such as paper or the like. The adhered triboelectric particles 80 are transferred at the roller 82 onto the receiving surface 84 whereat they are indicated by reference numeral 80*a*. The trioelectric electric particles 80*a* move with the receiving surface 84 and pass a heating element 86 which provides sufficient heat to permanently affix the triboelectric particles to the receiving surface.

Figure 6:
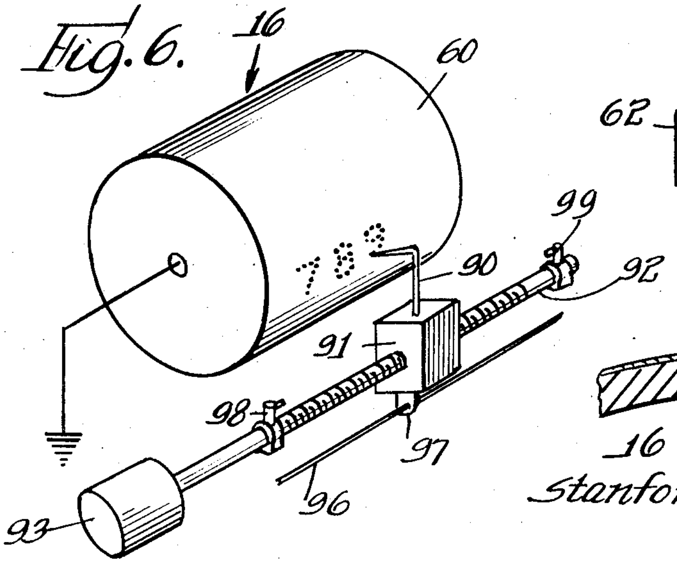
FIG. 6 is an alternate form of apparatus for scanning and selectively altering elemental points of a film at precise topographic sites on the surface of a drum by the use of a spark discharge device.

Referring now to FIG. 6 there is shown an alternate form of apparatus for supplying energy to discrete points on the surface of the drum 16 to store information thereon. In the embodiment shown in FIG. 6 it will be understood that the apparatus of FIG. 1 may be used to sequentially control the various apparatus functions. Here, the energy applied to the surface of the drum 16 is in the form of a spark discharge established between the drum surface and an electrode 90 connected to a suitable high voltage source which may be located within a support housing 91. The spark discharge may be considered a narrow beam of energy similar to that developed by the laser diode 32. In this instance, the drum 16 may be grounded to provide a current path for the spark discharge. Each time a spark passes between the electrode 90 and the drum 16 the elemental area of the drum receiving the spark will change from its low resistance conducting condition to its high resistance blocking condition or visa versa depending on the time duration of the spark discharge. The support housing 91 is mounted on a threaded rod 92 and traverses from side to side depending on the direction of rotation of the rod as influenced by a reversible motor 93. The energization and direction of the motor 93 may be effected by an auxiliary function control which is part of the decoder and translator 20 of FIG. 1, and which may provide other auxiliary functions as needed, for example, the spark discharge device may be operated during both directions of travel thereof to eliminate the time necessary to traverse the spark discharge device back to a start position. A guide rod 96 engages a boss 97 of the housing 91 to prevent angular displacement of the electrodes 90 thereby maintaining a uniform distance between the electrode tip and the surface of the drum 16. A pair of limit switches 98 and 99 are provided to sense the extreme end travel positions of the support housing 91 and stop further rotation of the threaded shaft 92 to prevent over-travel of the electrode 90 at the end of each scan line 44 and to initiate a new scan line to apply a new group of spark discharge pulses to the drum surface.

From the foregoing detailed description it will be understood that variations and modifications may be effected without departing from the spirit and scope of the novel concepts of this invention.

What is claimed is:

1. In combination with a computer or the like which generates output signals representing information on data and the manner it is to be printed out, a system for printing out such information comprising a layer of memory material capable, when given amounts of energy are applied thereto, of having discrete portions thereof reversibly structurally altered between a first stable structural condition and a stable condition of different structure, each of said structural conditions persisting indefinitely even after all sources of energy have been removed therefrom, said layer of memory material normally being in one of said conditions; energy beam producing means for sequentially scanning said layer of memory material for applying energy thereto at desired portions thereof to alter said layer in said desired portions between said first and second stable conditions; memory means for storing said output signals; control and translating means responsive to said stored output signals of said computer or the like for developing groups of energizing pulses and for energizing said energy beam producing means in accordance with a group of said pulses during each scanning sweep thereof to produce a pattern of altered conditions in said layer of memory material corresponding to the information to be printed out; means for applying to said layer of memory material imprint producing means which selectively adheres to a greater extent on the portions of said layer of memory material in one of said stable condition than the other stable condition; and means responsive to said imprint producing means on the selected portions of said layer of memory material for producing a corresponding imprint on a surface to be printed.

2. The combination of claim 1 wherein said layer of memory material is on a rotatable drum and said energy beam producing means scans the drum surface axially thereof said energy beam producing means, said means for applying imprint producing means and said means responsive to said imprint producing means are located at different circumferentially spaced points at the drum periphery so an information storage and printout operation can be performed in one revolution of the drum, and there is provided a second energy applying means for selectively applying energy to said layer of memory material which resets said portions of said layer of memory material to the normal stable condition thereof, to permit the application of a new pattern of high and low stable portions on said layer of memory material, said second energy applying means being inoperable when multiple copies are to be printed out by successive revolutions of the drum.

3. The combination of claim 1 wherein said energy beam producing means selectively produces a momentary application of energy where the control and translating means indicates that the discrete portion of said layer of memory material in the normal stable condition thereof scanned by said energy beam is to be set to the other stable condition, and said layer of memory material being alterable to said other stable condition by said momentary application of energy provided by said energy beam producing means, and there is provided second energy applying means for selectively applying energy to said layer of memory material which resets said portions of said layer of memory material to said normal stable condition, to permit the application of a new pattern of high and low stable portions on said layer of memory material said second energy applying means being inoperable when multiple copies are to be printed out by successive revolutions of the drum.

* * * * *